United States Patent [19]

Yamamoto et al.

[11] 4,320,202

[45] Mar. 16, 1982

[54] INORGANIC ELASTIC FOAMED PRODUCTS AND METHOD OF THE PREPARATION THEREOF

[75] Inventors: Kyukichi Yamamoto, Kamakura; Masaji Kurosawa, Matsudo; Taro Matsui, Nara, all of Japan

[73] Assignee: Nichias Corporation, Tokyo, Japan

[21] Appl. No.: 127,312

[22] Filed: Mar. 5, 1980

[30] Foreign Application Priority Data

Mar. 9, 1979 [JP] Japan .................................. 54-26704

[51] Int. Cl.$^3$ ............................................. C04B 21/00
[52] U.S. Cl. ..................................... 501/80; 264/45.3
[58] Field of Search .............. 106/40 R, 41; 264/45.3, 264/45.1, 42

[56] References Cited

U.S. PATENT DOCUMENTS 3,261,894  7/1966  Seidl ................................. 106/40 R
3,510,394  5/1970  Cadotte ............................ 106/40 R
3,744,984  7/1973  Sato .................................. 106/40 R

FOREIGN PATENT DOCUMENTS 5073916 10/1973 Japan ................................ 106/40 R Primary Examiner—Earl C. Thomas
Assistant Examiner—Mark Bell
Attorney, Agent, or Firm—Thomas R. Morrison

[57] ABSTRACT

Elastic foamed products or articles having a much better heat resistance than that of the asbestos fiber foamed mass, prepared by drying of an aqueous fiber-dispersed slurry retaining bubbles and consisting essentially of inorganic fibers, synthetic fluormica of the non-restrictive swelling type and surface active agents. In the elastic foamed products, the inorganic fibers having films of the fluormica formed therebetween are evenly entangled with each other, said films having bubbles retained therein.

2 Claims, No Drawings

INORGANIC ELASTIC FOAMED PRODUCTS AND METHOD OF THE PREPARATION THEREOF

BACKGROUND OF THE INVENTION

The present invention is concerned with improvements in or relating to elastic foamed articles or products composed mainly of inorganic fibers and method for the preparation thereof.

In the prior art relating to the above-mentioned type of inorganic foamed products, there is a well established method which involves stirring of the asbestos fibers in water with the addition of surface active agents to form an asbestos-dispersed slurry entraining and retaining bubbles, and placement of the thus obtained slurry in a desirable mold in the foamed state, followed by drying and, optionally, baking.

The asbestos fibers which generally fall under inorganic fibers can be well dispersed in water with the addition of surface active agents so that they are almost completely opened. This is because they have a thin thickness and a higher degree of softness in comparison with other artificial inorganic fibers such as ceramic fibers encompassing alumina, silica, alumina silicate or zirconic fibers, rock wool, glass fibers, carbon fibers and the like fibers. The asbestos fibers are evenly entangled with each other during the preparation of the above-mentioned inorganic foamed products thanks to their well dispersibility in water, thus giving a fiber-dispersed slurry retaining bubbles in a stable state. Not the least of the problems stemming from the use of asbestos is, however, that it has an adverse influence on the work environment. The asbestos is also disadvantageous in that it possesses rather poor heat resistance; in other words, it merely withstands a temperature up to 500° C.

On the other hand, artificial inorganic fibers such as the aforesaid ceramic fibers, rock wool, glass fibers, carbon fibers and the like fibers offer no appreciable problems in view of the work environment; however, difficulties are encountered in the preparation of a fiber-dispersed slurry retaining bubbles in a stable state. This is because such fibers have a larger thickness and a much lower degree of softness in comparison with the asbestos fibers, and are thus inferior in the dispersibility in water and the water-retaining properties. For this reason, it is impossible to obtain from such fibers the elastic foamed products as discussed above.

SUMMARY OF THE INVENTION

The present invention has been accomplished to solve the foregoing problems and has for its main object to afford a high degree of dispersibility in water to the artificial inorganic fibers to prepare an inorganic foamed mass in which bubbles are stably retained, without the use of the asbestos fibers.

Another object of the present invention is to provide an improved method of the preparation of such elastic foamed products.

DETAILED DESCRIPTION OF THE INVENTION

As a consequence of extensive studies carried out with a view to attaining the foregoing objects, it has now been found that fluormica capable of undergoing swelling in water, inter alia, synthetic fluormica of the non-restrictive swelling type permits very effective opening and dispersing of the artificial inorganic fibers in water, and ensures stable retaining of water.

According to one aspect of the present invention, there is provided an inorganic elastic foamed product consisting essentially of inorganic fibers, synthetic fluormica of the non-restrictive swelling type and surface active agents, in which the inorganic fibers are entangled with each other and have films of the fluormica formed therebetween, said films having bubbles retained therein.

According to another aspect of the present invention, there is provided an improved method of the preparation of inorganic elastic foamed products, which comprises mixing under agitation inorganic fibers, surfactants and synthetic fluormica of the non-restrictive swelling type together with water to form a fiber-dispersed slurry retaining bubbles, and forming the slurry into a desirable shape by drying, followed by baking, if required.

In the art, a variety of mica materials that can artificially be synthesized are available. Some types of these mica materials swell in water and cleave finally into very fine particles, and are generally referred to as the swelling type fluormica. The resultant crystals are obtained in the anhydrous form, and have a tendency toward incremental expansion under the presence of water by the taking-up of the water molecules in between their layers. One type of the fluormica is called the restrictive swelling type since such incremental expansion terminates at the stage where the water molecules are taken up in one or two layers, whilst the other type is called the non-restrictive swelling type since the water molecules are taken up in three or more layers. It is to be noted, however, that the restrictive swelling type fluormica materials cannot be used in the present invention, since it is very likely that they cleave into powders upon drying due to their poor film-foaming function.

The most advantageous properties of the synthetic fluormica of the non-restrictive swelling type are colloid-forming, film-forming and ion-exchange functions that are closely correlative with its swelling properties. Referring particularly to the colloid-forming function, the resultant sol has a viscosity higher than that of a sol of naturally occurring montmorillonite by a factor of about ten on the understanding that it is of high quality. This synthetic fluormica also possesses lubricating properties resulting from that fact that it cleaves in water even upon receipt of a weak force. The film-forming function ensures that the concentrated sol excels in extensibility, while the ion-exchange function permits uniform dispersion of fine particles of the fluormica in water due to interlaminar ions characteristic thereof, thus ensuring that the fine particles move with a large surface area.

Thus, the present invention dexterously takes advantage of the above-mentioned swelling type fluormica. It has now been ascertained that, when such fluormica is added to and mixed under agitation with an essential composition consisting of inorganic fibers and surface active agents, the characteristic features of the fluormica that it swells in water into a colloidal state have a synergistic effect on the foamed product in which it is required that the fibers exhibit a satisfactory dispersibility; a great bonding force be obtained between the dispersed fibers; bubbles be retained in a stable state and an increased viscosity be obtained. In particular, it has been found that, like the asbestos fibers, a slurry having fibers uniformly dispersed therein and retaining bubbles in a stable state can be obtained even from thick, tough, hydrophonic and inorganic fibers which can artificially be made, such as the aforesaid ceramic fibers, rock wool, glass fibers, carbon fibers or the like fibers.

The method according to the present invention may be carried out in various manners. The method which deserves first mention comprises mixing of water with all the starting materials, inorganic fibers, surface active agents and swelling fluormica under agitation to obtain a fiber-dispersed slurry retaining bubbles. In the case of using only the long-fibers as the inorganic fibers, a slurry obtained by mixing of the swelling fluormica with water may be added under mixing and agitation to a slurry prepared by mixing of the long-fibers with the surface active agents to form a fiber-dispersed slurry retaining bubbles. Alternatively, in the case of using a mixture of long- and short-fibers, particularly a fiber mixture of composed mainly of short-fibers, the short-fibers and the swelling fluormica may be mixed under agitation with water to form a fiber-dispersed slurry which is in turn added and mixed under agitation with the surfactants and the long-fibers to form a desired fiber-dispersed slurry retaining bubbles. In another embodiment, the swelling fluormica, inorganic long-fibers and surfactants are added to and mixed under agitation with a slurry obtained by mixing under agitation the inorganic short-fibers and surfactants together with water to obtain a fiber dispersed slurry retaining bubbles. In still another embodiment, the inorganic long-fibers and the non-restrictive swelling type fluormica as well as a combination of anionic and nonionic surfactants or anionic and amphoteric surfactants are added to a slurry obtained by mixing the inorganic short-fibers and the cationic surface active agent together with water while stirring is effected, thereby to form a fiber-dispersed slurry retaining bubbles which is in turn dried into a desirable shape and baked.

The thus obtained fiber-dispersed and bubble-retained slurry with its volume being doubled or trebled is dried into a desired shape in a conventional manner. For example, this is achieved by drying and, optionally, baking of the slurry in a suitable mold. In particular, the fiber-dispersed slurry according to the present invention can be heated directly to temperature ranging from 200° to 350° C. without any pre-heating while retaining a desired shape. This is responsible for the fact that the bubbles are retained in the slurry in a stable state. In addition, gradual heating of the slurry results in a reduction in the drying duration. It should be understood in the present invention that such drying may be achieved in various manners, for example, by infrared, hot-air or high-frequency drying.

As the surface active agents used in the preparation of the elastic foamed products according to the present invention, use is preferably made of a combination of anionic and nonionic surfactants and a combination of anionic and amphoteric surfactants in view of both the dispersibility of inorganic fibers and the foaming properties. In the case of previously dispersing only the inorganic short-fibers with the surface active agents, however, the cationic surfactants may be used. Subsequently, a combination of anionic and nonionic surfactants may be applied at the time of the addition of the remaining components. Examples of the anionic surfactants are dodecylbenzene sulfonic acid soda, polyoxyethylene nonyl phenol ether etc.; those of the nonionic surfactants are polyoxyethylene alkyl ethers, aliphatic esters of polyoxyethylene sorbitan etc.; those of the cationic surfactants are polyoxyethylene laurylamine, halogenated alkyl pyridine etc.; and those of the amphoteric surfactants are coconut betaine etc.

The amount of the surface active agents added is preferably 1.2 to 16.0% by weight of the total solid content, taking into account the dispersibility of fibers, the foaming rate of the fiber-dispersed slurry retaining bubbles, the bulk density of the inorganic elastic foamed product or the like factors. As the fillers, use is preferably made of inorganic materials such as kaolin, bentonite, clay, perlite, vermiculite and the like, but organic fibers such as pulp may suitably be employed. Addition of the fillers is to improve the drying conditions, i.e., to lower the drying temperature and shorten the drying duration.

If the aforesaid ceramic, rock wool or glass short-fibers are mainly used as the inorganic fibers, then it is possible to improve the dispersibility of the short-fibers and the elasticity of the foamed product and shorten the drying duration by the addition of the inorganic long-fibers having a length of about 2 to about 10 mm as an aid for the short-fibers.

The amount of the swelling fluormica added is 20 to 50% by weight, preferably 25 to 35% by weight calculated relative to the entire solid matters. In an amount less than 20% by weight, the strength of the foamed product drops while, in an amount larger than 50% by weight, the bubbles undergo excessive expansion so that any mass having a desired density is not obtained.

In addition the inorganic fibers as mentioned hereinbefore, silica fibers, steel fibers, alkali-resistant fibers, wollastonite or polycrystalline fibers may be employed with good results.

The present invention will now be elucidated with reference to non-restrictive examples and control examples. Table 1 shows the inorganic fibers used in the respective examples, and Table 2 shows the amounts of the starting materials used, the drying temperatures applied, and the physical properties of the products obtained.

EXAMPLES 1–4 AND CONTROL EXAMPLES 1–2

In these examples, the inorganic fibers, surface active agents, synthetic fluormica and fillers in the amounts as set out in Table 2 were mixed under agitation with the given amount of water to form a fiber-dispersed slurry retaining bubbles. In example 3, the fluormica was used in an amount approximate to the upper limit of 50% by weight whereas, in example 4, the surface active agents were used in an amount approximate to the upper limit of 16% by weight.

Control examples 1–2 are illustrative of the cases where (1) the fluormica was used in excess; and (2) the restrictive swelling type fluormica was used, respectively.

In these examples, the anionic surfactant used was dodecylbenzene sulfonic acid soda manufactured by Kao Atlas K.K. and available under the trade name "Neoplex F-60"; and the nonionic surfactant used was polyoxyethylene nonyl phenyl ether manufactured by the same company and available under the trade name "Emulgen 909".

The fiber-dispersed slurry obtained in each example was dried in a suitable mold or vessel having a filter paper at the bottom at the given drying temperatures. For the bulk specific gravity and recovery modulus of the product obtained in each of the examples and control examples, refer to Table 2.

In control example 1, it was impossible to apply a high drying temperature due to the presence of much fluormica, so that the drying duration was considerably extended. The obtained product was also found to have a decreased recovery modulus since the weight of the fibers was too small.

In control example 2, it was difficult to keep the foams stable over an extended period of time since the fluormica used was poor or deficient in the film-forming function; in other words, it was substantially impossible to obtain any products having foams uniformly distributed therein. Accordingly, the resultant product had a strength insufficient for handling thereof and a very small or no appreciable recovery modulus.

EXAMPLES 5-7 AND CONTROL EXAMPLE 3

In each examples, the short-fibers, the surface active agents, the fillers and water in the amounts as specified in Table 2 were added under agitation to a slurry obtained by stirring and mixing of the long-fibers, the fluormica and the surface active agents in the amounts as set out in Table 2 to obtain a fiber-dispersed slurry retaining bubbles. The obtained slurries were then dried in the same manner as mentioned hereinbefore. For the physical properties of the products obtained in the respective examples, see Table 2.

In control example 3, it was impossible to obtain any foamed product because of the absence of fluormica.

EXAMPLES 8-9 AND CONTROL EXAMPLE 4

In each example, the short-fibers, the surface active agents, the fillers and water were mixed together under agitation in the amounts as set out in Table 2 to form a fiber-dispersed slurry to which were in turn added under agitation the long-fibers, the fluormica and the surface active agents in the amounts as set out in Table 2, thereby preparing an end fiber-dispersed slurry retaining bubbles. The resultant slurries were dried in the same manner as mentioned hereinbefore. For the physical properties of the obtained products, see Table 2.

In control example 4, it was impossible to obtain any foamed products.

EXAMPLE 10

In this example, the surface active agents were used in an amount approximate to the upper limit of 15% by weight. For the results, see Table 2.

EXAMPLE 11

The short-fibers and the cationic surfactant in the given amounts were mixed under agitation with the given amount of water to form a fiber-dispersed slurry to which were thereafter added the long-fibers, the fluormica and the anionic and nonionic or amphoteric surfactants in the given amounts. The resultant liquid product was then mixed under agitation to prepare an end fiber-dispersed slurry retaining bubbles. This slurry was dried into a desired shape and baked. For the results, see Table 2. The cationic surfactant used in this example was polyoxyethylene laurylamine manufactured by Kao Atlas K.K. and available under the trade name "Ameat 102".

As will be understood from the foregoing, the present invention renders it feasible to use other artificial inorganic fibers than the asbestos fibers for the purpose of preparing a fiber-dispersed slurry in which the fibers are well opened while bubbles are retained in a stable state. From this slurry an inorganic elastic foamed product is obtained as discussed hereinbefore, which has a small bulk density but a large recovery modulus.

In particular, the present invention provides an inorganic elastic foamed product which can withstand elevated temperatures on the order of 600° to 1500° C. since use can be made of highly heat-resistant inorganic fibers.

TABLE 1

| Examples | Inorganic Fibers Used | |
| --- | --- | --- |
| | Short-Fibers | Long-Fibers |
| 1 | Ceramic | — |
| 2 | " | Carbon |
| 3 | " | " |
| 4 | — | alkali-resistant glassy |
| 5 | Ceramic | Glass |
| 6 | ceramic + rock wool | " |
| 7 | ceramic | " |
| 8 | " | carbon |
| 9 | rock wool | " |
| 10 | ceramic | " |
| 11 | " | " |
| Control Ex. | | |
| 1 | ceramic | carbon |
| 2 | " | " |
| 3 | " | " |
| 4 | " | " |

TABLE 2

| | Examples | | | | | | | | | | | Control Ex. | | | |
| --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 1 | 2 | 3 | 4 |
| Inorganic short-fibers (parts by weight) | 45 | 39 | 45 | | 48 | 28 19* | 46 | 39 | 60 | 40 | 38 | 31 | 40 | 55 | 55 |
| Inorganic long-fibers (parts by weight) | | 9 | 6 | 49 | 7 | 8 | 8 | 9 | 4 | 5 | 10 | 5 | 10 | 7 | 1 |
| Fluormica of the non-restrictive swelling type (parts by weight) | 45 | 24 | 45 | 30 | 23 | 23 | 25 | 29 | 24 | 33 | 34 | 60 | 25 | — | 10 |
| Surfactants (parts by weight) | 10A | 4A | 3A 1N | 7A 6N | 4A 4N | 4A 4N | 4A 4N | 3A 1N | 1A 1N | 8A 7N | 2C$^a$ 3A 1N | 2A 2N | 3A 1N | 5A 5N | 10A 10N |
| Fillers (parts by weight) | | C 24 | | K 8 | K 14 | 5K 14 | K 8P | K 19 | K 10 | K 7 | C 15 | | K 25 | C 28 | C 14 |
| Water (100 × parts by weight) | 8.1 | 8.0 | 9.0 | 9.5 | 8.5 | 8.2 | 8.1 | 8.0 | 8.5 | 8.0 | 8.0 | 8.0 | 8.0 | 9.0 | 8.5 |
| Drying temp. °C. | 200 | 350 | 300 | 350 | 350 | 400 | 350 | 400 | 400 | 350 | 350 | 80 | 400 | — | — |
| Bulk density g/cm$^3$ | 0.04 | 0.023 | 0.028 | 0.030 | 0.035 | 0.035 | 0.048 | 0.0242 | 0.035 | 0.038 | 0.031 | 0.06 | 0.03 | — | — |

TABLE 2-continued

| | Examples | | | | | | | | | | | Control Ex. | | | |
|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 |
| Recovery modulus % | 90 | 100 | 100 | 98 | 96 | 98 | 100 | 98 | 95 | 96 | 95 | 30 | 0 | — | — |

*carbon fibers
A Anionic Surfactant
C Clay
N Nonionic Surfactant
K Kaolin
C$^a$ Cationic Surfactant
P Pulp

We claim:

1. An inorganic elastic foamed product prepared by drying of an aqueous fiber-dispersed slurry retaining bubbles and consisting essentially of inorganic fibers, from 20–50% by weight synthetic fluormica of the non-restrictive swelling type and from 1.2–16% by weight surface active agents, in which the inorganic fibers are entangled with each other and have films of the fluormica formed therebetween, said films having bubbles retained therein.

2. The inorganic elastic foamed product as recited in claim 1, in which the inorganic fibers include at least one of long-fibers of glass, silica, carbon and steel and short-fibers of ceramic including rock wool, glass, wollastonite and polycrystalline short-fibers.

* * * * *